United States Patent
Oh et al.

(10) Patent No.: US 7,504,929 B2
(45) Date of Patent: Mar. 17, 2009

(54) METHOD AND SYSTEM FOR UPDATING RFID TAG VALUE OF TRANSFERRED OBJECT

(75) Inventors: Kyunghee Oh, Seoul (KR); Byung Ho Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 564 days.

(21) Appl. No.: 11/114,292

(22) Filed: Apr. 26, 2005

(65) Prior Publication Data

US 2006/0124737 A1 Jun. 15, 2006

(30) Foreign Application Priority Data

Nov. 29, 2004 (KR) .................... 10-2004-0098640

(51) Int. Cl.
 *H04Q 9/00* (2006.01)
(52) U.S. Cl. .................... 340/10.51; 340/10.1; 340/505; 340/501; 340/825.69; 340/825.72; 340/10.4; 235/385
(58) Field of Classification Search ................ 340/505, 340/501, 825.69, 825.72, 10.1, 10.4, 10.51; 235/385
 See application file for complete search history.

(56) References Cited

U.S. PATENT DOCUMENTS 7,025,263 B2 * 4/2006 Kocott ...................... 235/385
2005/0134449 A1 * 6/2005 Barile et al. ............... 340/505

FOREIGN PATENT DOCUMENTS

KR 20020074494 9/2002

OTHER PUBLICATIONS

The Blocker Tag: Selective Blocking of RFID Tags for Consumer Privacy; Ari Juels et al; CCS'03 Oct. 27-31, 2003, Washington, D.C., © 2003.
RFID Privacy Using User-controllable Uniqueness; Sozo Inoue et al; System LSI Research Center.

* cited by examiner

*Primary Examiner*—Brian A Zimmerman
*Assistant Examiner*—Vernal U Brown
(74) *Attorney, Agent, or Firm*—Ladas & Parry LLP

(57) ABSTRACT

A system for updating a radio frequency identification (RFID) tag value of a transferred object is contemplated. The RFID tag is updated by having a transferor's RFID reader read an RFID tag attached to an object being transferred and extracting a first RFID tag value. An open RFID value is deciphered through the extracted first RFID tag value. Then, the transferor's RFID reader transmits the first RFID tag value and open RFID value to an RFID reader of a transferee who is receiving the object having the attached RFID tag. The transferee's RFID reader extracts a second RFID tag value of the RFID tag of the transferred object. By using the received first RFID tag value and open RFID value, the second RFID tag value is updated. Accordingly, even using RFID, the property rights of an object having an attached RFID tag can be transferred while maintaining security.

11 Claims, 2 Drawing Sheets

METHOD AND SYSTEM FOR UPDATING RFID TAG VALUE OF TRANSFERRED OBJECT

CROSS-REFERENCE TO RELATED PATENT APPLICATIONS

This application claims the benefit of Korean Patent Application No. 10-2004-0098640, filed on Nov. 29, 2004, in the Korean Intellectual Property Office, the disclosure of which is incorporated herein in its entirety by reference.

BACKGROUND OF THE INVENTION

1. Field of the Invention

The present invention relates to a method and system for updating a radio frequency identification (RFID) tag value of a transferred object, and more particularly, to a method and system for updating an RFID tag value of a transferred object by which when the property right of the object using the RFID is transferred, the RFID tag value attached to the object is updated from the RFID tag value of the transferor to the RFID tag value of the transferee without leaking the open RFID value.

2. Description of the Related Art

Radio frequency identification (RFID) is a sensor technology by which an electronic chip is attached to an object and by using wireless communication technologies, information on the object is confirmed and surrounding situational information is sensed. An RFID tag uses an electronic product code (EPC) in order to indicate its uniqueness. If the EPC is used, a predetermined object can be identified uniquely around the globe.

Meanwhile, since RFID is performed through wireless communication, the RFID can be easily evesdropped on. Accordingly, a method to protect privacy when the RFID is used is needed.

As solutions for protecting privacy, there are methods, including that by which a locking key is used to protect privacy such that an open RFID value such as the EPC code cannot be used, that by which an open RFID value is stored in a separate database, and that by which a meta ID value is exchanged between an RFID tag and an RFID reader such that only RFID readers knowing the key value can identify the open RFID value.

However, though these methods can solve the evesdropping problem while the owner of an object holds and manages the object, there is a problem that when the ownership of the object is transferred by a transferor using RFID for a transferee, the RFID locking is released and can be evesdropped on.

In order to solve this problem, there are methods such as kill tag that makes RFID unable to be used at all, and a blocking tag that makes an RFID reader unable to read an RFID tag. However, these methods also have a problem that the RFID cannot be used permanently or temporarily.

SUMMARY OF THE INVENTION

The present invention provides a method and system for updating a radio frequency identification (RFID) tag value of a transferred object in an RFID system formed with an RFID tag, an RFID reader of a transferor, an RFID reader of a transferee, and a network, in which when the property right of the object using the RFID is transferred, the RFID reader of the transferee updates the RFID tag value of the transferor with the RFID tag value of the transferee without leaking the open RFID value.

According to an aspect of the present invention, there is provided a method for updating a radio frequency identification (RFID) tag value of a transferred object, the method including: transferor's RFID reader reading an RFID tag attached to an object being transferred and extracting a first RFID tag value; deciphering an open RFID value through the extracted first RFID tag value; the transferor's RFID reader transmitting through a network the first RFID tag value and open RFID value to an RFID reader of a transferee receiving the object with the attached RFID tag; and the transferee's RFID reader extracting a second RFID tag value of the RFID tag attached to the transferred object, and by using the transmitted and received first RFID tag value and open RFID value, updating the second RFID tag value with a new RFID tag value.

According to another aspect of the present invention, there is provided a system for updating an RFID tag value of a transferred object, the system including: a first communication unit receiving a first RFID tag value extracted by reading the RFID tag from an RFID reader of a transferor of an object with an attached RFID tag, and an open RFID value deciphered from the first RFID tag value; a first detection unit extracting a second RFID tag value from the RFID tag attached to the transferred object; and an updating unit receiving the first RFID tag value and the open RFID value from the communication unit, receiving the second RFID tag value from the first detection unit, determining whether or not the first RFID tag value is the same as the second RFID tag value, and if it is determined that the first and second RFID tag values are the same, updating the second RFID tag value of the RFID tag attached to the transferred object, with a new RFID tag value, by using the first RFID tag value and the open RFID value.

According to still another aspect of the present invention, there is provided a system for updating an RFID tag value of a transferred object, the system including: an RFID reader of a transferor disposed in the transferor side of the object with an attached RFID tag, reading the RFID tag of the object, extracting a first RFID tag value, and generating an open RFID value from the extracted RFID tag value; an RFID reader of a transferee disposed in the transferee side of the object, receiving the first RFID value and the open RFID value, extracting a second RFID tag value from the RFID tag attached to the transferred object, determining whether or not the first RFID tag value is the same as the second RFID tag value, and if it is determined that the first and second RFID tag values are the same, updating the second RFID tag value of the RFID tag attached to the transferred object, with a new RFID tag value, by using the first RFID tag value and the open RFID value; and a network transmitting the RFID tag value and the open RFID value from the RFID reader of the transferor to the RFID reader of the transferee.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
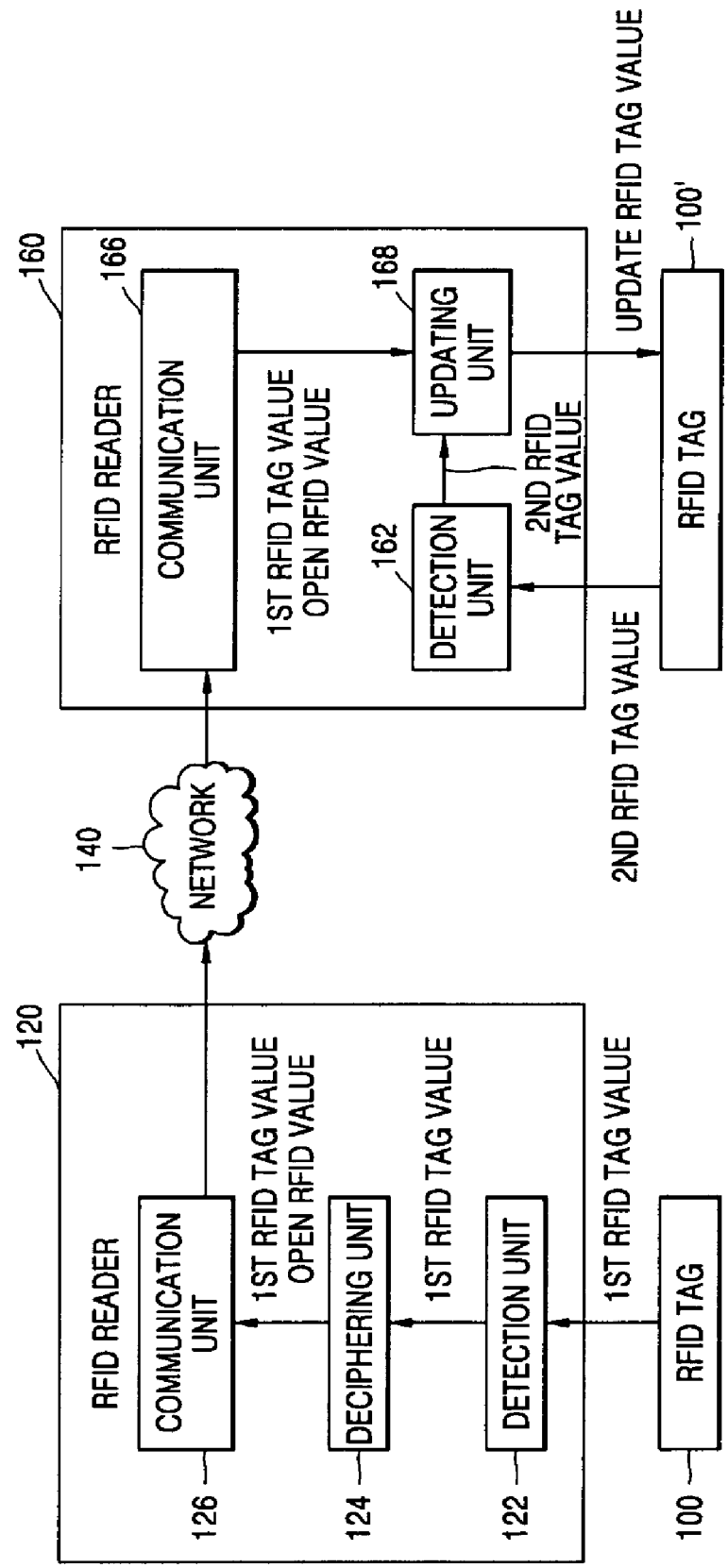
FIG. 1 illustrates the structure of a system for updating an RFID tag value of a transferred object according to a preferred embodiment of the present invention.

FIG. 1 illustrates the structure of a system for updating a radio frequency identification (RFID) tag value of a transferred object according to a preferred embodiment of the present invention.

Referring to FIG. 1, the RFID system is formed with an RFID tag 110 whose ID value is expressed as a random number that can be read only by an RFID reader of an owner of an object, RFID readers 120 and 160 that read the RFID tag value, decipher an open RFID value of the object, and update the RFID tag value with a new random number, and a network 140 which safely transmits the RFID tag value of the transferor of the object, and the open RFID value, to the RFID reader of a transferee of the object, by applying a security method.

The RFID readers 120 and 160 are divided into the RFID reader 120 of the transferor and the RFID reader 160 of the transferee according to the respective roles.

The RFID reader 120 of the transferor includes a detection unit 122 reading the value of the RFID 100, a deciphering unit 124 interpreting the RFID tag value into an open RFID value, and a communication unit 126 transmitting the RFID tag value and the open RFID value through the network 140.

The RFID reader 160 of the transferee includes a communication unit 166 receiving the RFID tag value and open RFID value from the communication unit 126 of the RFID reader 120 of the transferor through the network 140, a detection unit 162 reading the value of the RFID tag 100', and an updating unit 168 updating the RFID tag value with a new RFID tag value.

Here, when the transferor transfers the object to the transferee, the RFID tag 100' becomes the same as the RFID tag 100 in the transferor side.

The operation of property right transfer using an RFID tag will now be explained with reference to FIG. 2, in more detail with an example case where an object of a transferor is transferred to a transferee, that is, when the RFID tag 100 in the transferor side is transferred to the RFID tag 100' in the transferee side.

Figure 2:
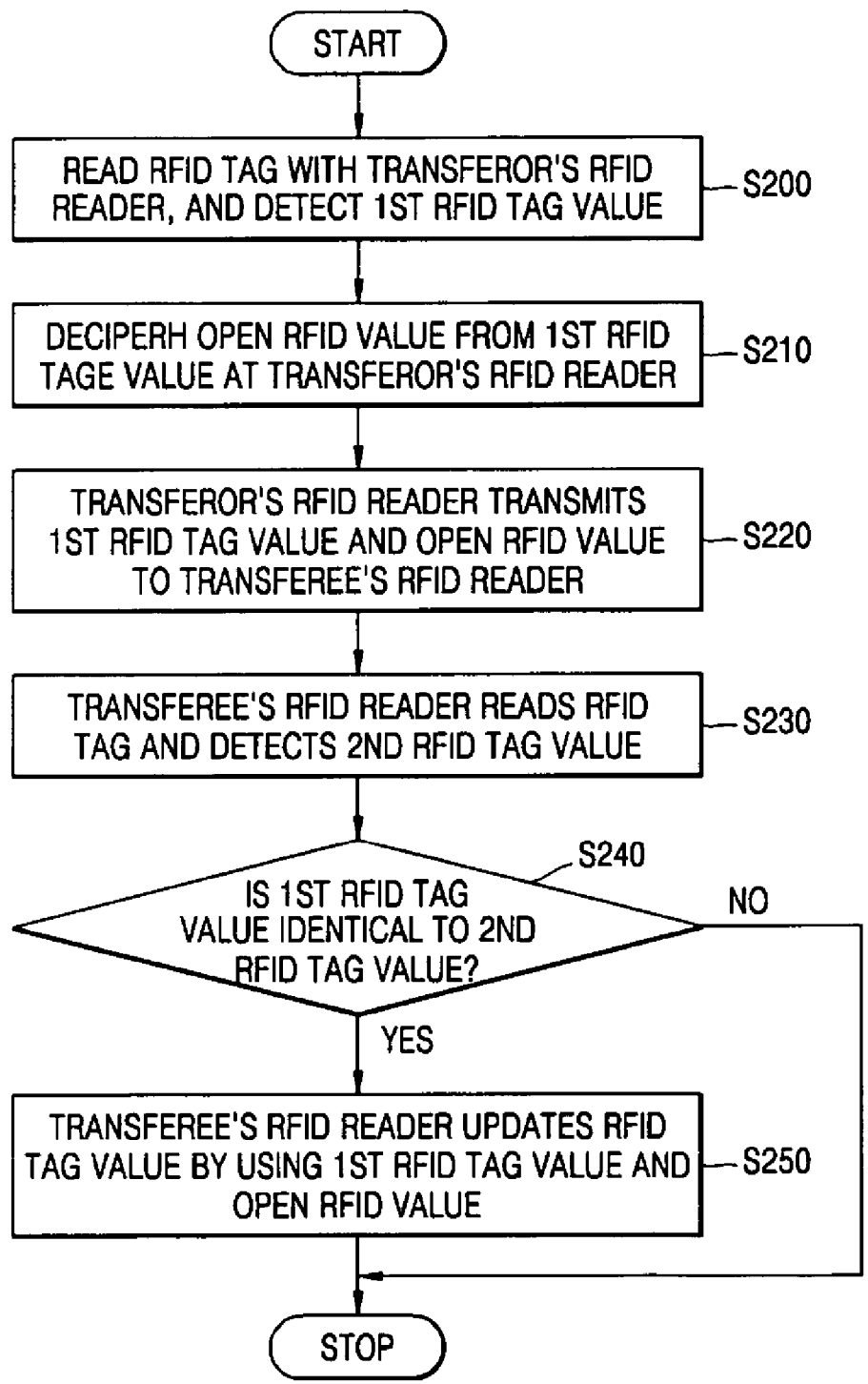
FIG. 2 is a flowchart of the operations performed by a method for updating an RFID tag value of a transferred object according to a preferred embodiment of the present invention.

FIG. 2 is a flowchart of the operations performed by a method for updating an RFID tag value of a transferred object according to a preferred embodiment of the present invention.

Referring to FIG. 2, first, the detection unit 122 of the RFID reader 120 of the transferor reads the RFID tag 100 attached to an object of a property right desired to be transferred, and transmits the value to the deciphering unit 124 in operation S200.

Next, the deciphering unit 124 of the RFID reader 120 of the transferor deciphers an open RFID value through the first RFID tag value detected in the operation S200, in operation S210.

More specifically, for example, the open RFID value may be determined as a value generated by decoding the first RFID tag value, or as any one of values corresponding to the first RFID tag value, in a mapping table stored in the RFID reader 120 of the transferor.

Next, the communication unit 126 of the RFID reader 120 of the transferor transmits the open RFID value deciphered in the operation S210 and the first RFID tag value detected in the operation S200 to the communication unit 166 of the RFID reader 160 of the transferee in operation S220.

In the operation S220, when the communication unit 126 of the RFID reader 120 of the transferor transmits the open RFID value deciphered in the operation S210 and the first RFID tag value detected in the operation S200 to the communication unit 166 of the RFID reader 160 of the transferee, a network security method is applied to the transmission so that the values can be safely transmitted.

As the network security methods, there are a harmful signal filtering system, a virtual private network (VPN), a firewall, a switch, an intrusion detection system, a quality of service (QoS), backbone switch, and a virus scanner, and these can be individually disposed such that the network security method can be performed.

Next, the detection unit 162 of the RFID reader 160 of the transferee reads the RFID tag 100' attached to the object transferred from the transferor, and transmits it to the updating unit 168 in operation S230.

Then, the updating unit 168 of the RFID 160 of the transferee determines whether or not the first RFID tag value transmitted in operation S220 is the same as the second RFID tag value detected in the operation S230, in operation S240.

If the determination result in the operation S240 indicates that the first RFID tag value is not the same as the second RFID tag value, the operation is finished. Meanwhile, if the determination result in the operation S240 indicates that the first RFID tag value is the same as the second RFID tag value, operation S250 is performed.

In the operation S250, the updating unit 168 of the RFID reader 160 of the transferee updates the RFID tag value of the RFID tag 100', by using the first RFID tag value or the second RFID tag value and the open RFID value.

More specifically, for example, when the RFID tag value is updated with a new RFID tag value by using the first RFID tag value and the open RFID value, the new RFID tag value may be determined as a value generated by ciphering a random number already stored in the RFID reader in the transferee side, with the open RFID value, or any one of values corresponding to the open RFID value, in a mapping table stored in the RFID reader 160 in the transferee side.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The present invention relates to a method and system for updating an RFID tag value of a transferred object and has the following advantages.

When the property right of an object using RFID is desired to be transferred, the RFID reader of the transferor transmits an RFID tag value and an open RFID value to the RFID reader of the transferee through a safe network such that the RFID reader of the transferee can update the RFID tag value with an RFID tag value that can be deciphered only by the RFID reader of the transferee, without additional information.

By doing so, while security can be maintained, the transfer of the property right of the object with the attached RFID tag is enabled, and furthermore, during the process of the property right transfer, RFID can be enabled continuously.

What is claimed is:

1. A method for updating a radio frequency identification (RFID) tag value of a transferred object, the method comprising:

transferor's RFID reader reading an RFID tag attached to an object being transferred and extracting a first RFID tag value;

deciphering an open RFID value through the extracted first RFID tag value;

the transferor's RFID reader transmitting through a network the first RFID tag value and open RFID value to an RFID reader of a transferee receiving the object with the attached RFID tag; and the transferee's RFID reader extracting a second RFID tag value of the RFID tag attached to the transferred object, and by using the transmitted and received first RFID tag value and open RFID value, updating the second RFID tag value with a new RFID tag value.

2. The method of claim 1, wherein the open RFID value is a value generated by decoding the first RFID tag value.

3. The method of claim 1, wherein the open RFID value is a value in a mapping table already stored in the RFID reader of the transferor, corresponding to the first RFID tag value.

4. The method of claim 1, wherein the updating of the second RFID tag value with a new RFID tag value comprises:

the RFID reader of the transferee reading the RFID tag attached to the transferred object and extracting the second RFID tag value;

determining whether or not the first RFID tag value is the same as the second RFID tag value; and if it is determined that the first and second RFID tag values are the same, updating the second RFID tag value of the RFID tag attached to the transferred object, with a new RFID tag value, by using the first RFID tag value and the open RFID value.

5. The method of claim 1, wherein in the updating of the second RFID tag value with a new RFID tag value by using the first RFID tag value and the open RFID value, the new RFID tag value is a value generated by ciphering the open RFID value.

6. The method of claim 1, wherein in the updating of the second RFID tag value with a new RFID tag value by using the first RFID tag value and the open RFID value, the new RFID tag value is a value corresponding to the open RFID value, in a mapping table already stored in the RFID reader of the transferee.

7. The method of claim 1, wherein in the transmitting by the RFID reader of the transferor, of the first RFID tag value and the open RFID value to the RFID reader of the transferee, the values are transmitted by a network security method.

8. A system for updating an RFID tag value of a transferred object, the system comprising:

a first communication unit receiving a first RFID tag value extracted by reading the RFID tag from an RFID reader of a transferor of an object with an attached RFID tag, and an open RFID value deciphered from the first RFID tag value;

a first detection unit extracting a second RFID tag value from the RFID tag attached to the transferred object; and an updating unit receiving the first RFID tag value and the open RFID value from the communication unit, receiving the second RFID tag value from the first detection unit, determining whether or not the first RFID tag value is the same as the second RFID tag value, and if it is determined that the first and second RFID tag values are the same, updating the second RFID tag value of the RFID tag attached to the transferred object, with a new RFID tag value, by using the first RFID tag value and the open RFID value.

9. The system of claim 8, wherein the RFID reader of the transferor of the object comprises:

a second detection unit extracting the first RFID tag value from the RFID tag attached to the transferred object;

a deciphering unit deciphering the open RFID value from the first RFID tag value detected in the second detection unit; and a second communication unit transmitting the first RFID tag value and the open RFID value to the first communication unit.

10. A system for updating an RFID tag value of a transferred object, the system comprising:

an RFID reader of a transferor disposed in the transferor side of the object with an attached RFID tag, reading the RFID tag of the object, extracting a first RFID tag value, and generating an open. RFID value from the extracted RFID tag value;

an RFID reader of a transferee disposed in the transferee side of the object, receiving the first RFID value and the open RFID value, extracting a second RFID tag value from the RFID tag attached to the transferred object, determining whether or not the first RFID tag value is the same as the second RFID tag value, and if it is determined that the first and second RFID tag values are the same, updating the second RFID tag value of the RFID tag attached to the transferred object, with a new RFID tag value, by using the first RFID tag value and the open RFID value; and a network transmitting the RFID tag value and the open RFID value from the RFID reader of the transferor to the RFID reader of the transferee.

11. The system of claim 10, wherein when the first RFID tag value and the open RFID value are transmitted from the RFID reader of the transferor to the RFID reader of the transferee, the values are transmitted by a network security method.

* * * * *